No. 742,702. PATENTED OCT. 27, 1903.
J. F. MEIGS & H. G. JAKOBSSON.
RAPID FIRE GUN.
APPLICATION FILED JUNE 16, 1902.
NO MODEL. 5 SHEETS—SHEET 4.
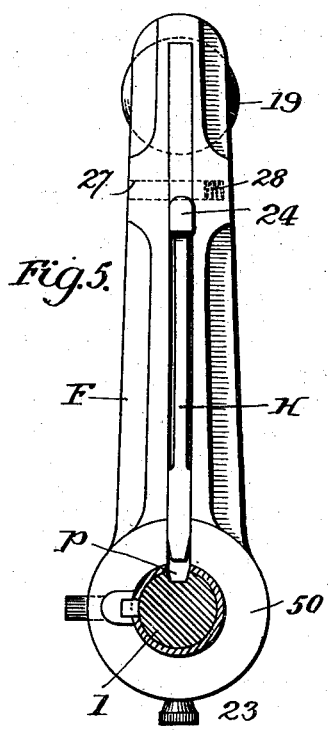
Fig. 5.
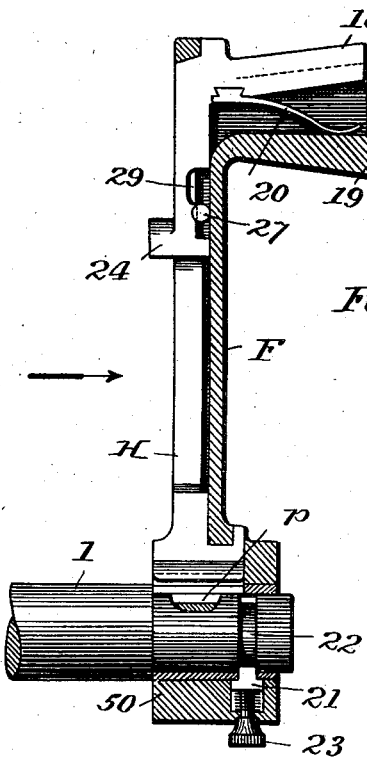
Fig. 6.
Fig. 13
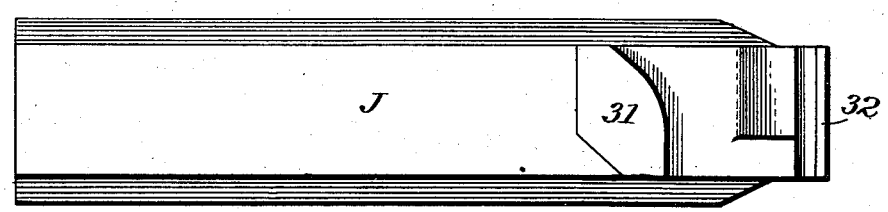
Fig. 14
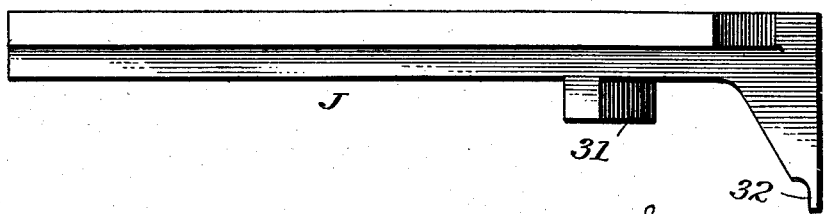
Witnesses
J. G. Hinkel
J. J. McCarthy
Inventors
John F. Meigs
Herman G. Jakobsson
By
Attorneys

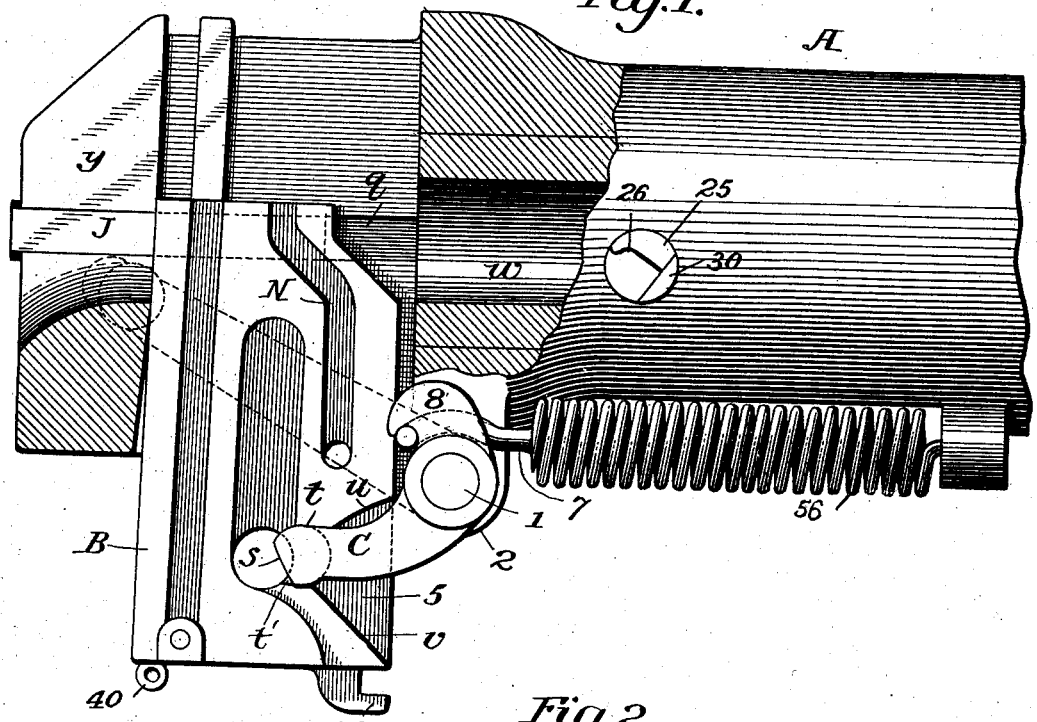
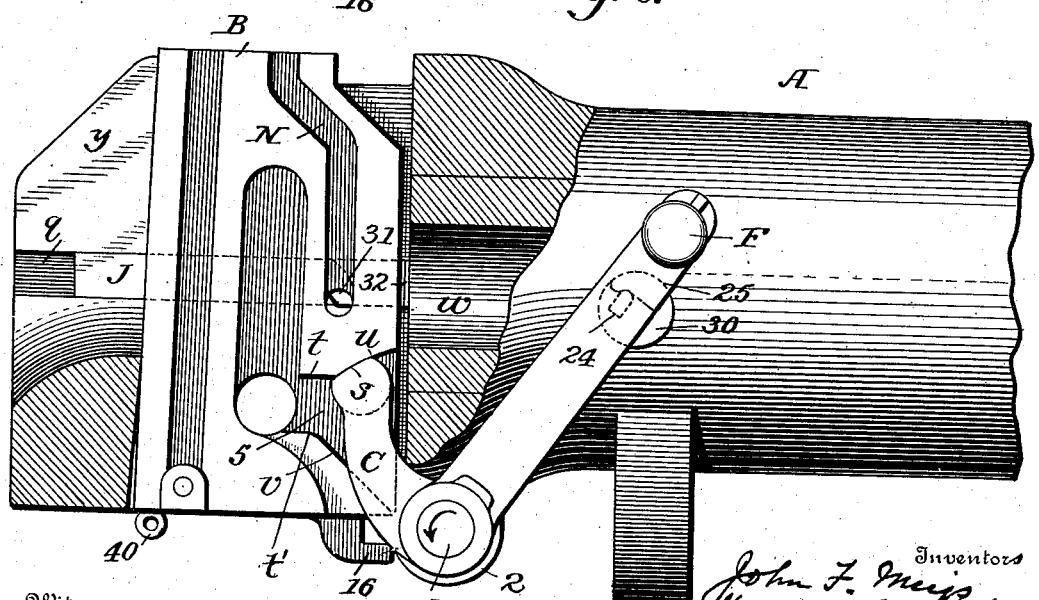

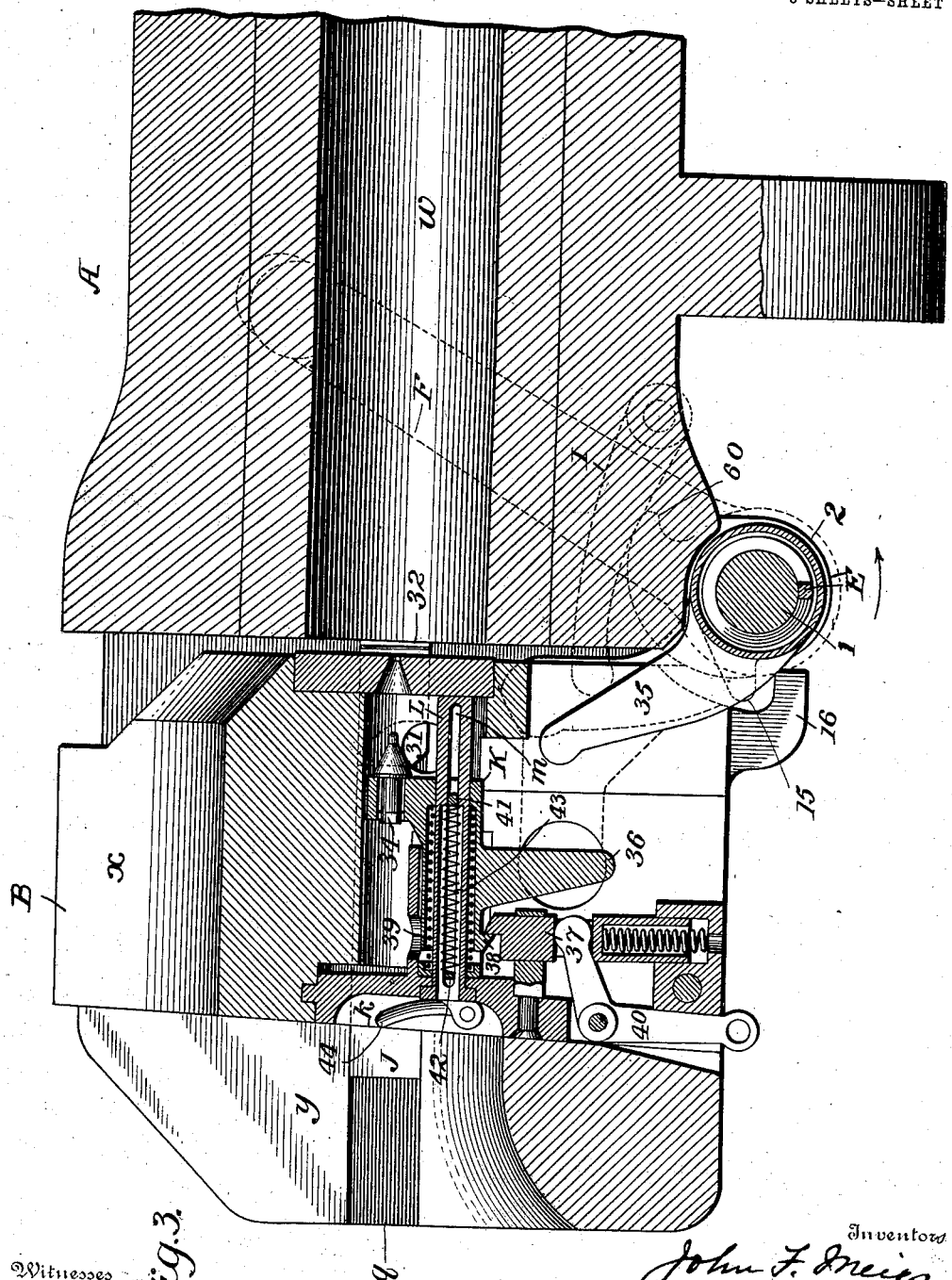

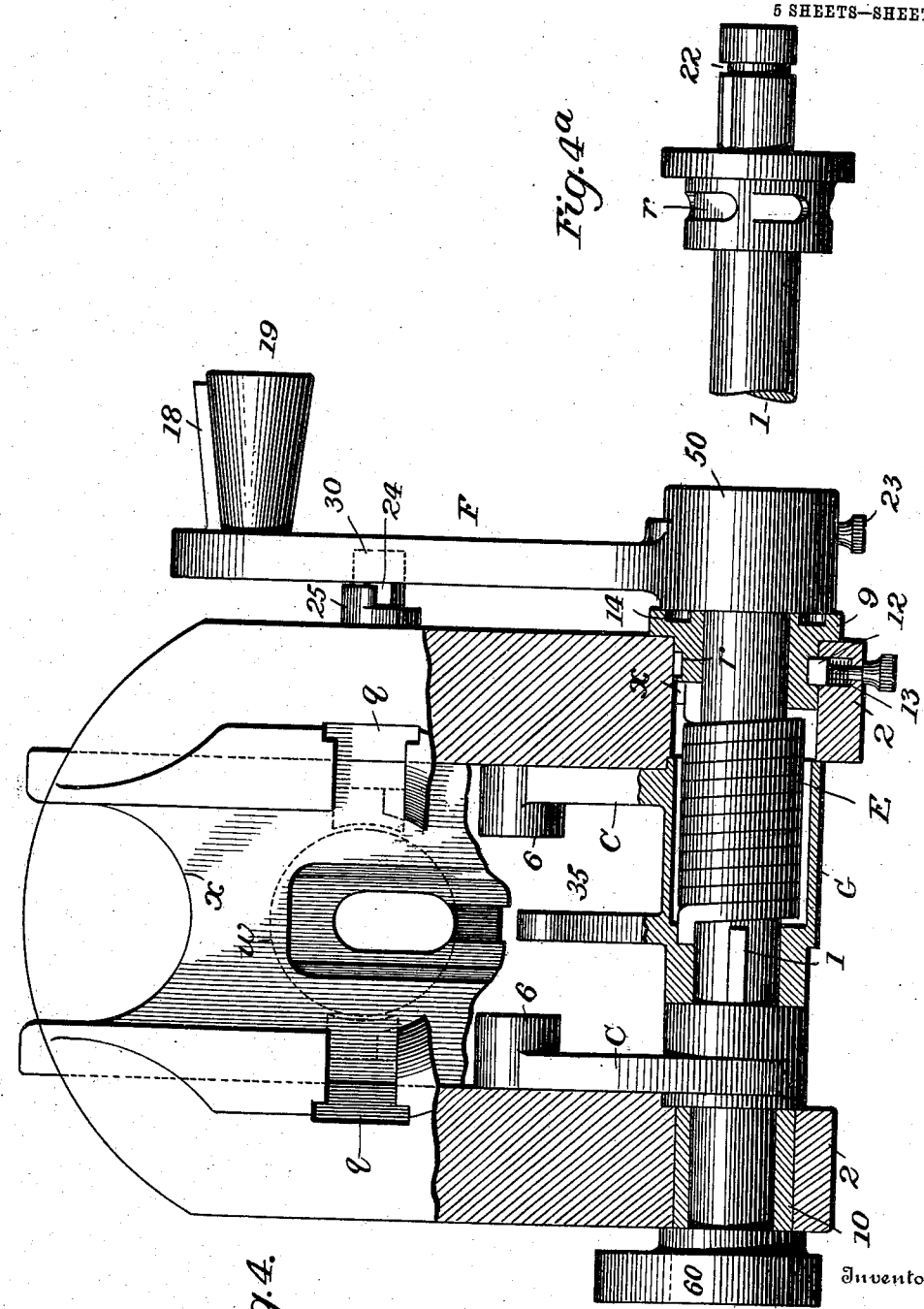

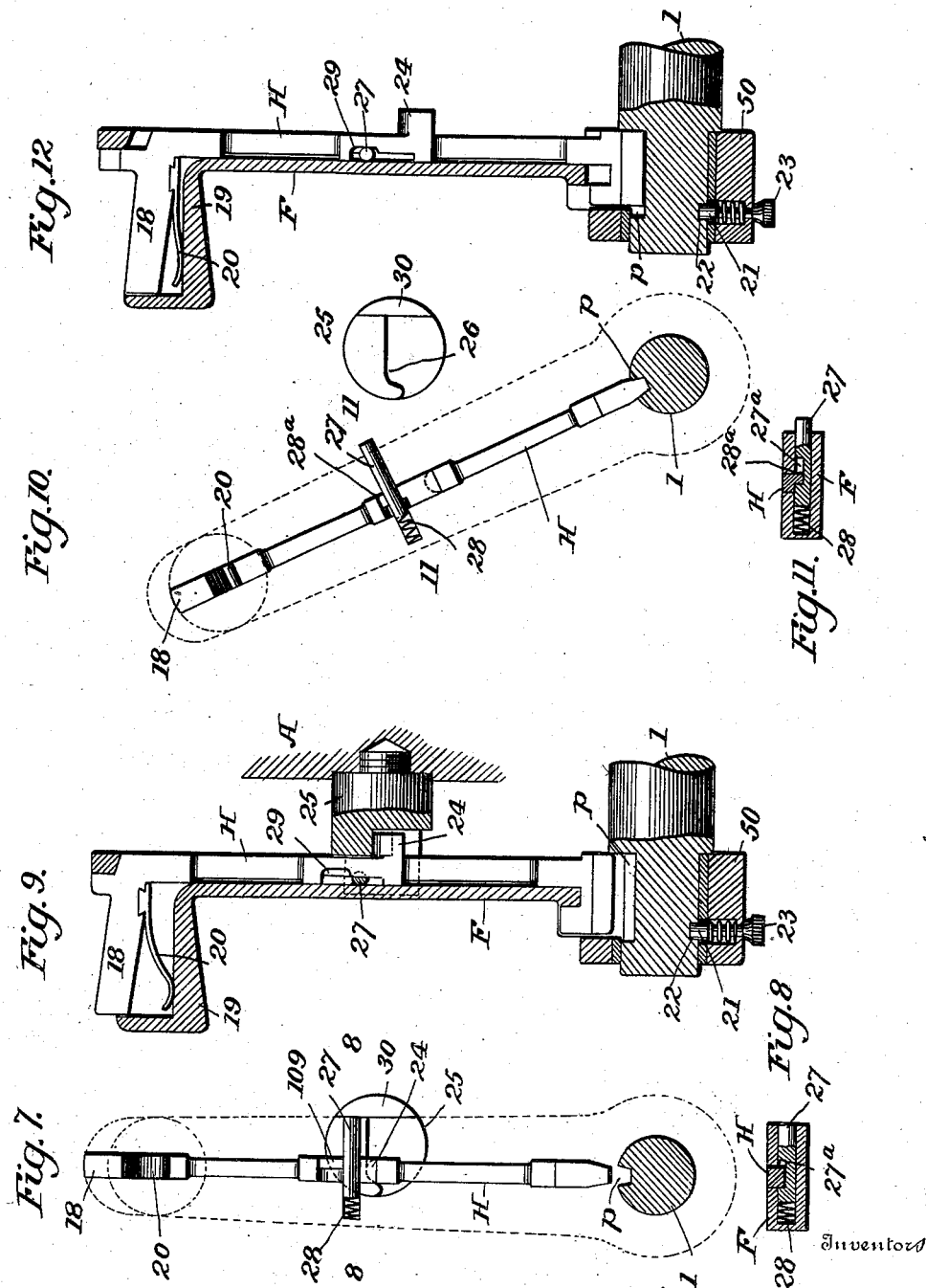

No. 742,702.

Patented October 27, 1903.

UNITED STATES PATENT OFFICE.

JOHN FORSYTH MEIGS AND HERMAN G. JAKOBSSON, OF BETHLEHEM, PENNSYLVANIA, ASSIGNORS TO BETHLEHEM STEEL COMPANY, OF SOUTH BETHLEHEM, PENNSYLVANIA, A CORPORATION OF PENNSYLVANIA.

RAPID-FIRE GUN.

SPECIFICATION forming part of Letters Patent No. 742,702, dated October 27, 1903.

Application filed June 16, 1902. Serial No. 111,956. (No model.)

*To all whom it may concern:*

Be it known that we, JOHN FORSYTH MEIGS and HERMAN G. JAKOBSSON, citizens of the United States, residing at Bethlehem, in the county of Northampton and State of Pennsylvania, have invented certain new and useful Improvements in Rapid-Fire Guns, of which the following is a specification.

This invention relates to certain new and useful improvements in rapid-fire guns; and the invention consists in the novel construction and arrangement of parts of the breech mechanism and in the improved means for operating the breech-block, all substantially as hereinafter set forth, and illustrated in the accompanying drawings, wherein—

Figure 1 is a part vertical section of the breech end of a gun embodying our improvements and showing the breech-block in its lowered position ready for loading. Fig. 2 is a similar view with the breech-block elevated. Fig. 3 is an enlarged vertical central section through the gun and the breech-block, the latter being shown elevated. Fig. 4 is an end view and part transverse section through the lower part of the block-receiving chamber of Fig. 3, the block being removed. Fig. 4ª is a detail view of one end of the rock-shaft and one of the bushings therefor. Fig. 5 is a side view of the operating hand-lever, showing the means for locking it to the rock-shaft. Fig. 6 is a vertical section of Fig. 5. Figs. 7, 8, 9, 10, 11, and 12 are detail views of the hand-lever and its locking means. Fig. 13 is a side view of one of the extractors, and Fig. 14 is an edge view thereof.

The gun A has a vertical recess at the breech for the reception of the vertically-sliding breech-block B, the latter being slightly tapered by inclining the rear face as shown and having a concave recess $x$ at the top adapted to coincide with the bore $w$ and with a recess $y$ at the extreme rear of the breech when the block is down to thereby permit the introduction of the ammunition from the rear into the bore. The requisite movements of the breech-block are imparted from a rock-shaft 1, turning in bearings 2 2 and carrying two arms or cranks C C, extending into recesses 5, one in each side of the breech-block, each recess 5 flaring forward and having a lower horizontal edge $t'$, preferably terminating in an inclined edge $v$, and an upper edge inclined at $u$ and having a horizontal portion $t$, and into each recess 5 extends a lug 6 at the inside of the adjacent crank C. Each lug 6 has a substantially flat face $s$, which when the breech-block is elevated meets the edge $u$ of the recess 5, as shown in Fig. 2, whereby any downward pressure upon the breech-block has no tendency to rock the shaft 1 to open the breech, but rather has a contrary effect. When the shaft 1 is rocked, however, in the direction of its arrow, Fig. 2, the lug 6 is carried from beneath the edge $u$ and is brought against the lower horizontal edge $t'$ and depresses or aids in depressing the breech-block. On a reverse movement of the shaft 1 the lug 6 is brought against the upper horizontal face $t$ at each side of the block, which is then raised until the parts take the position shown in Fig. 2, the two side bearings afforded by the two lugs insuring the upward movement of the breech-block without any side tilting or jamming.

A spring 56 is employed, so arranged and connected as to tend to resist the downward movement of the breech-block and prevent its abrupt descent and the shock resulting therefrom. This spring may be in two sections arranged beneath the gun at each side of the center, each section carrying a link 7, engaging a hook 8 upon the shaft 1, so that the spring is put under tension as the shaft revolves in the direction of the arrow, Fig. 2; but a preferable construction is shown in Figs. 3 and 4, where the spring E is a coiled torsion-spring of flat or round wire encircling the shaft 1 and connected at the inner end with said shaft and at the outer end with the adjacent bearing 2. In this form of the device a sleeve G surrounds the shaft 1 and is keyed thereto and carries the two arms or cranks C C, as best shown in Fig. 4, the inner portion of the sleeve at one end being cut away to receive the spring E, the sleeve extending between the bearings 2 2 of the shaft and protecting the spring against injury.

To facilitate the insertion and removal of the shaft 1 in its bearings, the recess in each bearing-lug 2 is adapted to receive a detachable bushing 9 or 10, in which the shaft turns, the bushing being recessed at $x$ to receive the adjacent end of the spring E and having at the periphery a ratchet $r$, the teeth of which engage a bolt 12, sliding in the lug 2 and carried toward the ratchet by means of a spiral spring 13.

The shaft 1 is provided with a hand-lever F, by means of which it may be rocked, and in the face of the bushing 9 are recesses 14 to receive a spanner, by means of which the bushing may be turned to alter the tension of the spring, the bolt 13 holding the bushing in place after adjustment.

Upon the shaft 1 or the sleeve G is a lug 15, adapted to engage a lug 16 at the bottom of the breech-block as the shaft 1 is turned to lower the block for the purpose of starting the same downward from the position in which it is wedged by the distention of the casing of the charge when fixed ammunition is employed, the cranks C thereafter continuing the downward movement of the breech-block.

If the hand-lever F were attached fixedly to the rock-shaft 1 and if the latter were automatically rocked to depress the breech-block when the gun runs out to battery, as hereinafter described, the lever F would at such time be swung rearward with liability to strike and injure any one standing by the gun. We therefore provide means whereby the hand-lever F may be connected with the rock-shaft when the latter is to be turned by hand in either direction, but whereby after the breech-block is set in position the lever may be disconnected from the rock-shaft and locked to the body of the gun while firing automatically. As shown, the shaft has a recess $p$, adapted to receive the end of a sliding bolt H, fitting a groove in the lever F and having a projection 18, which is parallel with the handle 19 of the lever, but normally separated therefrom, a spring 20 tending to maintain the two in their separated positions. The gunner on taking hold of the handle 19 presses on the projection 18 and moves the bolt H inward until its lower end enters the recess $p$, when the lever will be fixedly secured to the shaft, this movement of the bolt at the same time disengaging a projecting lug 24 on the bolt from a recess 26 in a stop-pin 25 on the gun. The hand-lever is now free to turn the shaft 1, and as soon as it has moved a little a locking-pin 27, movable in a recess in the lever, is thrust outward by the action of a spring 28 and enters a notch 29 in the bolt H, Fig. 12, thereby locking the bolt, the hand-lever, and the shaft together while the mechanism is open even though the gunner may let go of the handle. On closing the mechanism either by hand or automatically the hand-lever F is turned until it strikes a shoulder 30 on the stop-pin 25, the locking-pin 27 being thereby thrust inward and releasing the bolt H, so that it may now be drawn out of the recess $p$ in the shaft 1 by the spring 20, the lug 24 at the same time entering the recess 26 in the stop-pin and locking the hand-lever to the gun, so that in firing automatically the shaft 1 will turn in the nave 50 of the hand-lever while the latter remains stationary. The locking-pin 27 is provided with a notch $27^a$, through which the bolt slides freely when the pin is fully retracted, as best shown in Figs. 8 and 9, while when the pin is projected to lock the bolt in the position shown in Fig. 12 a shoulder $28^a$ on the bolt limits the outward movement of the pin. The lever F is held against movement lengthwise of the shaft 1 by a spring-bolt 21, the inner end of which enters a peripheral groove 22 in the shaft, the bolt having a head 23, by means of which it may be withdrawn to permit the lever to be removed from the shaft.

It is desirable that as the gun returns to battery the breech-block shall be lowered, and to effect this automatically we hang to any stationary part of the gun-carriage a pawl I, Fig. 3, the free end of which as the gun moves forward engages a rounded socket in a lug 60, fixed on the shaft 1 or the sleeve G, and thereby rocks the shaft in the direction of its arrow, Fig. 3, and depresses the breech-block. The breech-block is held in its depressed position by its upper face being engaged by lugs 31 upon extractors J, sliding in guideways $q$ in the breech and provided with lips 32, which engage the rim of the ammunition-case and draw it out as the extractors are moved to the rear, this being effected, as usual, by the edges of cam-slots N in the sides of the breech-block. When a new cartridge is inserted, the rim strikes the lips 32 and slides the extractors J forward away from the block, which can then rise automatically.

The firing-pin 34 is carried by the hammer K, sliding in the breech-block, and automatically pushed to the rear by the contact of an arm 35 on the rock-shaft 1 or the sleeve G thereon with an arm 36, projecting downward from the hammer, and a spring-bolt 37 engages a lip 38 on the hammer and holds the latter in its retracted position against the action of the firing-spring 39. The bolt 37 may be retracted by means of a lever 40, having an eye at the end for the attachment of a lanyard. It will be seen that when the breech-block is depressed either going down or rising the arm 35 is always in such a position that if the lanyard is pulled to release the hammer its arm 36 will make contact with the arm 35, and the striking of the cartridge is prevented. If the hammer is released and moves forward, when the block is down the arm 35 will reset the pin as the block rises.

It is sometimes desirable to retract or recock the hammer by hand, and we therefore extend through openings in the hammer a retracting-sleeve L, having a slot $m$ for the passage of a pin 41, passing transversely through the hammer and through the sleeve, and between a cross-pin 42 of the sleeve and the bottom of the hollow part of the sleeve L intervenes a spring 43, which tends to carry the sleeve inward to the position shown in Fig. 3. To the end of the sleeve L is pivoted a yoke 44, and the rear of the breech-block is provided with a recess $k$, into which the yoke 44 may be turned upward to permit the breech-block to descend. When it is desired to retract the hammer by hand, the yoke is drawn outward, serving as a handle by means of which the sleeve L is also drawn outward, carrying with it the hammer K, until the lip 38 is engaged by the bolt 37. On releasing the handle 44 the spring 43 then throws the sleeve L forward to the position shown in Fig. 3. If the handle 44 should remain in the horizontal position, it will meet the lower edge of the recess $y$ as the breech-block descends and will thereby be turned up into its position in the recess $k$, so as not to interfere with the descent of the breech-block.

Without limiting ourselves to the precise construction and arrangement of parts shown, we claim—

1. The combination in a breech-loading gun, of a vertically-sliding breech-block recessed at each side to form diverging bearing edges, a rock-shaft, arms carried by the rock-shaft provided with lugs engaging said edges, a lug upon the under side of the breech-block, and an engaging lug carried by the rock-shaft, substantially as set forth.

2. The combination with the vertically-moving breech-block and its operating rock-shaft, of a spring coiled round the shaft to be put under tension by the descent of the breech-block, a bushing connected with one end of the spring and provided with a ratchet, and a spring-bolt engaging the ratchet, substantially as set forth.

3. The combination with the movable breech-block and its operating rock-shaft, of a hand-lever upon the shaft, and a hand device for locking the lever to and unlocking it from the shaft, substantially as set forth.

4. The combination with the movable breech-block, its operating rock-shaft and hand-lever, of a bolt carried by the lever and adapted to a recess in the shaft, a spring for carrying the bolt out of said recess, and hand grasping devices upon the lever and bolt arranged to force the bolt toward the shaft when said devices are grasped, substantially as set forth.

5. The combination with the movable breech-block and its operating rock-shaft, of a hand-lever upon the shaft, a bolt carried by the lever and adapted to enter a recess in the shaft, a pin for locking the bolt in engagement with the shaft, means on the gun adapted to operate the pin to release the bolt, and a spring for retracting the bolt when released, substantially as set forth.

6. The combination with the movable breech-block and its operating rock-shaft, of a hand-lever, a bolt carried by the lever and adapted to alternately lock the same to the shaft and to the gun, a spring-actuated locking-pin for locking the bolt in engagement with the shaft, a stop on the gun adapted to be engaged by the locking-pin to move the latter in one direction to release the bolt from the shaft, and a spring for retracting the bolt when thus released and moving it into locking engagement with said stop, substantially as set forth.

7. The combination in a gun, open at the breech, of a sliding breech-block having a recess at the rear, a hammer, a retracting-sleeve L carried by the hammer and provided with a pivoted handle 44 adapted to enter said recess, substantially as set forth.

In testimony whereof we have signed our names to this specification in the presence of two subscribing witnesses.

JOHN FORSYTH MEIGS.
HERMAN G. JAKOBSSON.

Witnesses:
CLARENCE R. MILLER,
EDWIN A. MILLER.